Patented Dec. 7, 1937

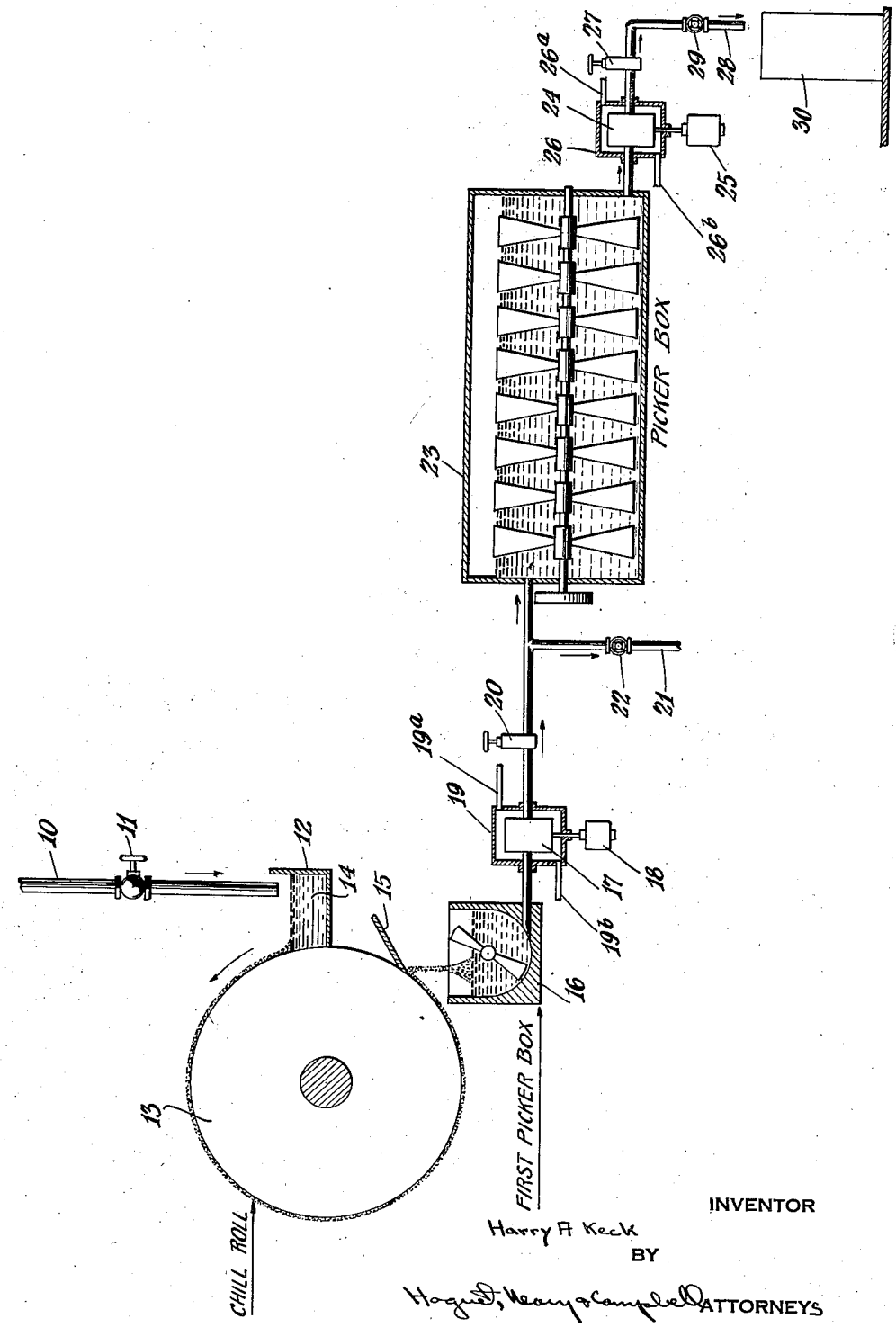

2,101,501

UNITED STATES PATENT OFFICE 2,101,501

PROCESS FOR FINISHING FATS

Harry A. Keck, Teaneck, N. J., assignor to Lever Brothers Company, a corporation of Maine Application July 23, 1935, Serial No. 32,713

3 Claims. (Cl. 99—122)

My invention relates to improvements in the manufacture or preparation of shortening for producing the desired physical characteristics in the finished product, and more particularly to a process for heating and texturizing the previously chilled fat whereby the maximum whiteness, uniformity and smoothness with a desired amount of properly distributed air is obtained.

It is well known by those versed in the art of shortening manufacture that certain difficulties exist in the methods commonly used in handling the fat from the time it leaves the chilling roll until it reaches the containers. The sudden chilling of the fat by the refrigerated roll tends to produce lumps, which remain in spite of subsequent working, so that the product often appears of coarse texture with streaks and small hard particles easily discernible to the eye. The crystal structure is likewise irregular and the product lacks plasticity. Also the characteristics of creaming in the cake dough mix and of forming a large volume cake are not present to the degree desired for a commercial product. Various attempts have been made to so treat the chilled fat that the above mentioned objectionable features would be eliminated and a smooth, uniform, white shortening in a form most suitable for the bakers' needs would be produced. One such process which has been used for many years comprises heating the chilled fat to a temperature at which it only softens slightly and then packing the fat and storing at the same temperature. This latter operation is called tempering. In carrying out the method, according to well known practice, the following steps are involved.

The various oils or fats, which are desired to be converted into shortening, are thoroughly admixed while in a melted condition and then rapidly congealed by causing the melted fat to flow in the form of a thin film over the surface of a refrigerated rotating metal cylinder. This cylinder is maintained at a temperature considerably lower than the congealing point of the fat. The thus congealed fat is scraped from the refrigerated cylinder and passed into a so-called picker box, the main purpose of which is to incorporate in the fat a certain amount of air by a beating operation and to partially smooth out any lumps formed in the fat by the previous sudden chilling operation. After leaving this picker box the aerated fat is pumped through a heating device usually of a type commonly known as the Reilly heater having a plurality of parallel tubes through which the fat passes. These tubes are surrounded by a heating medium such as hot water, steam, or the like. After leaving this heating device the fat is either packaged directly or it may be passed through a second picker box wherein its texture is further modified by an agitating operation. From this picker box the fat is then packaged and is usually placed in a storage "tempering" room where the fat is maintained at approximately 75° to 85° F. for twelve hours or longer.

In the prior art processes, such as described above, it is customary to incorporate approximately 12% of air in the fat while it is being agitated in the first picker box. This mixture of air and fat is then withdrawn by a pump from the picker box. The vacuum in the suction part of the pump employed for this purpose varies, dependent upon the plasticity and fluidity of the product, and also upon the openings in the ports of the pump. In most cases the vacuum is necessarily high, on account of the relatively solid consistency of the chilled fat, and in some cases this vacuum may be as much as 18 inches, or ⅔ of the theoretical possible vacuum. Obviously, when the vacuum is high, the air dispersed in the fat expands correspondingly, and the finely divided air bubbles burst and the shortening when delivered from the pump contains a large volume of free air rather than finely divided air. Consequently, when the shortening reaches the Reilly heater and passes through its parallel tubes, some of the fat contains very little air so that the fat with a lower air content has a higher heat transmission coefficient, hence this portion of the fat may be overheated or partially melted. As a result the shortening is not uniform, but is grainy, and uneven in color. Tests that I have performed show also that the fat at this stage has poor baking characteristics.

Also because of the consistency of the fat and the lumpy nature, the feed to the pump will be uneven. That is, the pump will "catch" and force the fat forward and then the feed may be diminished and for a few strokes the pump will not force the same amount of fat forward. This uneven operation of the pump varies the amount of fat through the heater and other subsequent equipment. In the case of the heater, for example, the heat absorbed by the fat will be uneven as a result and a non-uniform product produced. If texturating valves are used the uneven operation of the pump will result in uneven pressure and feed at the texturating valve and result in a non-uniform product.

In addition to the disadvantages of the commonly used pump on this aerated fatty material with the resultant non-uniform distribution of air in the chilled fat and undesirable characteristics of the fat after heating, the heating device itself possesses certain inherent limitations that cause deleterious effects in the finished product. Although a heater of the parallel tube type is effective in raising the mean temperature of the fat up to the desired point, the device operates so inefficiently that the physical characteristics of the fat are not uniform and the desired smooth texture and white color for the final product are not obtained. On account of the inherent structure of this type of heater and its method of operation, the fat, upon passing through the parallel tubes, has its outer portion, that is, the portion nearest the inside surface of the tubes, heated to a temperature, which results in liquefying this portion of the fat. In contrast to this excessively heated portion of fat, the remaining portion of the fat, that is, the fat nearest the center of the mass passing through the tubes, is not heated as much as it should be and, therefore, is not reduced to the desired soft semi-solid form. As is apparent, the net result of this heating operation is to produce a heterogeneous type of product consisting partly of excessively heated liquid and partly of an insufficiently heated solid. It is obvious that such a product would not possess the desired uniform smooth texture.

An object of my invention is to provide a simple method of treating shortening in such a manner that the disadvantages and limitations of the prior methods are overcome and a shortening product of extremely uniform fine texture and white color is produced.

Another and more specific object of my invention is to provide a method of treating shortening in which the previously chilled fat is simultaneously heated, agitated and propelled in such a manner that the uniformity, texture, color and baking characteristics of the final product are greatly enhanced and any remaining treatment of the fat is expeditiously effected.

In accordance with my invention, I utilize a more efficient means and method of heating, propelling, agitating and texturizing the fat preferably immediately after its removal from the first picker box and before further changes in crystalline structure have developed in the fat. By these means and method, which are described more in detail hereinafter, I have been able to produce a more homogeneous product and of a much whiter and smoother nature and with better baking characteristics than the products produced when utilizing the above described prior art operation. My novel method provides more efficient temperature control of the fat and more uniform distribution of the air in the fat, both of which are conducive to better texture and color. The improved product produced as a result of my new method of heating and agitating the fat just after its removal from the first picker box is in such form that it may be packaged immediately thereafter and tempered in the usual manner, although I may, if desirable, further texturize and heat the fat before it is packaged and tempered.

I have found that different types of oils and fats, which have been previously chilled by a chilling roll or other means, such as described above, require different types of temperature treatment just subsequent to their removal from the first picker box. For example, with some types of hydrogenated cottonseed oil I have found that by raising the temperature of the chilled product slightly, for example, 3° to 7° C., while simultaneously agitating and propelling the fat through the system, and then texturizing by expanding the product from approximately 400 pounds pressure to zero pounds pressure, that the desired uniform texture, smoothness and whiteness are obtained.

It is to be understood that the method characteristic of my invention is not limited to any specific type of equipment, for example, either a reciprocating steam or a rotary pump may be used as disclosed. I have found it advantageous to provide for the heating of the fat immediately upon leaving the first picker box by utilizing a pump having surfaces enclosing the fat equipped with jackets or electrical resistance coils or other suitable means for transferring heat to the fat in the pump or as supplied to it. For example, a heating medium such as hot water or steam may be circulated through enclosing jackets. This temperature controlled pump, creating a suction, draws the fat from the first picker box, regulates its temperature and then forces it through a high pressure texturizing valve and into the second picker box when the latter is used. The fat, upon passing through this pump is agitated and propelled by the pump and simultaneously is effectively and uniformly heated during such operation to the extent that its texture and color characteristics are greatly improved.

Because of the changes in crystalline structure within the fat developing immediately upon the chilling of the fat I have found it most desirable to carry out the heating and agitating action immediately upon the withdrawal of the fat from the picker box; that is before the changes in crystal structure have had time to develop to any material degree.

The novel features of my invention are set forth with particularity in the appended claims. The invention itself, however, both as to its organization and method of operation, will be clearly understood from the following more specific description taken in conjunction with the accompanying drawing. This drawing diagrammatically illustrates one system for carrying out the method of my invention, which, as stated, is not limited to the use of this specific type of equipment or its assembly, but is adaptable to various other types of systems, the drawing being given to more clearly illustrate one example of the operation of my invention.

Referring now to the drawing, the previously refined liquid fat passes through the feed line 10 controlled by valve 11 into the container 12. The large refrigerated roll 13, positioned adjacent the container 12, picks up a certain amount of the liquid fat 14. The roll 13 rotates counterclockwise, as indicated by the arrow, and effects a chilling of the liquid fat to a semi-solid mass, which is removed from the roll by the blade 15 and is caused to drop into the first picker box 16 in the usual manner. In this picker box 16 the fat is aerated and partially homogenized so that some of the lumps occurring in the fat are removed.

The chilled and aerated fat is removed from the picker box 16 by means of the pump 17 operated by the motor 18. This pump 17, as diagrammatically indicated, has an enclosing jacket 19. A heating medium may be circulated through this jacket, such as steam or hot water, which raises the temperature of the fat. The inlet and outlet for this jacket have been indicated by reference characters 19a and 19b, respectively. In view of the action of the pump in continually wiping clean the heat transfer walls, and simultaneously agitating the fat, the heat applied is uniformly and evenly distributed throughout the body of the fat. Also the fat in its resultant heat softened condition, is in a form suitable for texturizing and a positive agitating and working results from the operation of the pump. Further, as a result of the softening action of the heat on the fat, the fat flows easily and evenly and there is less loss of air.

While the pump 17 with its temperature control jacket 19 acting preferably immediately after the chilling operation effects the major proportion of the improvements in the product, I have found it desirable to operate this pump in connection with a high pressure texturizing valve or orifice 20, through which the fat is forced by the pump 17.

For some purposes the fat leaving the valve 20 is in suitable form for use and may be drawn off through the outlet line 21 controlled by the valve 22.

If further improvement of certain physical characteristics of the fat is desired, as is true in a number of cases, the fat leaving the valve 20 is then carried through the second picker box 23, which operates to further modify the texture and color of the fat. After leaving the picker box 23, the fat is then passed through a second pump 24 operated by a motor 25 and having a temperature control jacket 26. This temperature controlled pump 24 operates in substantially the same manner as the pump 17, further modifying and improving the texture and color of the fat. The jacket 26 on the pump 24 is supplied with either a heating or cooling medium by means of the inlet 26a and outlet 26b, according to the previous conditioning of the fat being treated.

The pump 24 may force the thus treated fat through a second high pressure texturizing valve or orifice 27 and from thence the fat passes out through the discharge line 28, controlled by the valve 29, into a suitable container diagrammatically shown at 30.

In view of the fact that when the temperature of the fat is controlled by the heated pumps 17 or 24, the vacuum required in the suction part of the pump is relatively small, the capacity of the pumps is increased and their operation is much smoother, resulting in increased production and more efficient overall operation. In addition to the other advantages, the heating of these pumps avoids accumulation of solidified fats in the ports and in the valve chamber.

By means of one or both of these heated pumps, the usual relatively high vacuum condition present in the suction is minimized, thereby maintaining a uniform distribution of air in the fat and reducing the necessary amount of air to be incorporated in the fat during its aeration. A relatively small amount of uniformly distributed air is conducive to uniform heating and texturizing and consequently improved texture and color results in the final product. The flow from the pump as a result of the heating operation by the pump, results in uniform conditions being present at the texturizing valve, giving a smoother texturizing operation, and better products. It is to be understood, if desired, that the heating pump jacket may extend to the inlet and outlet lines of the pump.

The expressions "texturizing" and "texturating" refer to an operation which takes place subsequent to the chilling and aerating of the fat, consisting in forcing it through an orifice under a relatively high pressure and releasing it into a zone at virtually atmospheric pressure. The expressions "texturating device" or "texturizing device" refer to a small orifice or valve through which the shortening is forced under a relatively high pressure.

It is to be understood that my invention is not limited to the specific methods and means described hereinbefore for treating the fat to produce the superior properties, but is susceptible to various modifications and changes, all of which come within the scope of the following claims.

What I claim as new is:

1. The process of finishing fats to form a substantially dry plastic shortening, which comprises chilling the fat to a semi-solid form, aerating the chilled fat, simultaneously agitating, heating and propelling the fat, and forcing it through a small texturizing orifice under pressure.

2. The process of finishing fats to form a substantially dry plastic shortening, comprising chilling the fat to a semi-solid condition, aerating the chilled fat, passing the fat through a temperature controlled pump whereby the fat is softened and agitated while passing through said pump, forcing the fat through a small texturizing orifice under pressure, and packaging the fat.

3. The process of finishing fats to form a substantially dry plastic shortening, comprising chilling the heated fat from a molten to a semi-solid condition, aerating the chilled fat, passing the fat through a heated pump in which it is softened and agitated while being propelled, forcing the fat through a small texturizing orifice under pressure, and packaging the fat.

HARRY A. KECK.